US012566597B2

(12) United States Patent
Sockalingasamy

(10) Patent No.: US 12,566,597 B2
(45) Date of Patent: Mar. 3, 2026

(54) OPTIMISING COMPUTER PROGRAM CODE

(71) Applicant: Taravu Ltd., London (GB)

(72) Inventor: Pressenna Sockalingasamy, London (GB)

(73) Assignee: Taravu Ltd., London (GB)

( * ) Notice: Subject to any disclaimer, the term of this patent is extended or adjusted under 35 U.S.C. 154(b) by 210 days.

(21) Appl. No.: 18/275,960

(22) PCT Filed: Feb. 11, 2022

(86) PCT No.: PCT/GB2022/050377
§ 371 (c)(1),
(2) Date: Aug. 4, 2023

(87) PCT Pub. No.: WO2022/172025
PCT Pub. Date: Aug. 18, 2022

(65) Prior Publication Data
US 2024/0103821 A1 Mar. 28, 2024

(30) Foreign Application Priority Data
Feb. 12, 2021 (GB) ...................................... 2101977

(51) Int. Cl.
*G06F 8/41* (2018.01)
(52) U.S. Cl.
CPC ............ *G06F 8/433* (2013.01); *G06F 8/4443* (2013.01)
(58) Field of Classification Search
CPC ...................................................... G06F 8/443
See application file for complete search history.

(56) References Cited

U.S. PATENT DOCUMENTS

| | | | | |
|---|---|---|---|---|
| 6,041,179 A | * | 3/2000 | Bacon ................... | G06F 9/4491 717/151 |
| 6,161,217 A | | 12/2000 | Detlefs et al. | |
| 6,175,956 B1 | | 1/2001 | Hicks et al. | |
| 6,223,340 B1 | | 4/2001 | Detlefs | |
| 6,567,974 B1 | * | 5/2003 | Czajkowski ........ | G06F 9/44563 717/161 |

(Continued)

OTHER PUBLICATIONS

Hölzle, Urs, Craig Chambers, and David Ungar. "Optimizing dynamically-typed object-oriented languages with polymorphic inline caches." European conference on object-oriented programming. Berlin, Heidelberg: Springer Berlin Heidelberg, 1991.*

(Continued)

*Primary Examiner* — Francisco J Aponte
(74) *Attorney, Agent, or Firm* — Klarquist Sparkman, LLP

(57) ABSTRACT

A computer-implemented method for optimising object-oriented program code comprises receiving object-oriented program code and performing a static analysis on a call of the object-oriented program code to simulate an effect of the call on an abstract state. Static-analysis data is generated, representative of the effect of the call on the abstract state. An object graph, generated from the program code, is introspectively accessed to determine a property of the call. Optimised program code is generated from the received object-oriented program code, using the static-analysis data and the determined property to optimise the call in the optimised program code.

20 Claims, 4 Drawing Sheets

(56)        References Cited

U.S. PATENT DOCUMENTS

| | | | | |
|---|---|---|---|---|
| 6,704,927 | B1* | 3/2004 | Bak | G06F 9/4491 |
| | | | | 717/148 |
| 6,851,106 | B1* | 2/2005 | Narisawa | G06F 8/24 |
| | | | | 717/116 |
| 6,865,730 | B1* | 3/2005 | Burke | G06F 9/4491 |
| | | | | 717/157 |
| 8,036,921 | B2* | 10/2011 | Kumar | G06Q 10/04 |
| | | | | 705/7.11 |
| 8,473,899 | B2* | 6/2013 | Centonze | G06F 8/4434 |
| | | | | 717/130 |
| 8,572,591 | B2* | 10/2013 | Cwalina | G06F 9/44521 |
| | | | | 717/147 |
| 8,578,352 | B1* | 11/2013 | Mitrovic | G06F 9/4552 |
| | | | | 717/148 |
| 9,424,015 | B2* | 8/2016 | Marathe | G06F 8/4442 |
| 9,734,040 | B2* | 8/2017 | Gounares | G06F 11/3636 |
| 9,946,523 | B2* | 4/2018 | Archambault | G06F 8/4442 |
| 10,241,763 | B2* | 3/2019 | Mahaffey | G06F 8/43 |
| 10,261,765 | B1 | 4/2019 | Prokopec et al. | |
| 10,417,036 | B2* | 9/2019 | Bonetta | G06F 8/30 |
| 2003/0051234 | A1 | 3/2003 | Schmidt | |
| 2007/0245324 | A1 | 10/2007 | Inglis et al. | |
| 2008/0172662 | A1 | 7/2008 | Harris et al. | |
| 2009/0094588 | A1* | 4/2009 | Chipman | G06F 9/4488 |
| | | | | 717/141 |
| 2012/0054725 | A1 | 3/2012 | Inglis et al. | |
| 2014/0189660 | A1* | 7/2014 | Wright | G06F 8/433 |
| | | | | 717/137 |
| 2014/0289712 | A1* | 9/2014 | Gupta | G06F 11/3608 |
| | | | | 717/131 |
| 2016/0170724 | A1 | 6/2016 | Mahaffey | |
| 2016/0180096 | A1* | 6/2016 | Sharma | G06F 21/577 |
| | | | | 726/25 |
| 2016/0188435 | A1* | 6/2016 | Abadi | G06F 8/443 |
| | | | | 717/106 |
| 2017/0141791 | A1* | 5/2017 | Balegar | G06F 16/2462 |
| 2017/0147304 | A1 | 5/2017 | Doyle et al. | |
| 2018/0060048 | A1 | 3/2018 | Gampe et al. | |
| 2018/0088917 | A1* | 3/2018 | Gao | G06F 8/4434 |
| 2018/0143813 | A1* | 5/2018 | Meyer | G06F 8/456 |
| 2018/0373515 | A1* | 12/2018 | Brown | G06F 8/4434 |
| 2020/0380416 | A1* | 12/2020 | Zion | G06Q 30/0202 |
| 2022/0308543 | A1* | 9/2022 | Paudel | G05B 19/0428 |

OTHER PUBLICATIONS

IPO Search Report under Section 17(5) for Great Britain Application No. 2101977.3, dated Jun. 25, 2021, 4 pages.
International Search Report and Written Opinion for PCT/GB2022/050377, mailed May 25, 2022, 14 pages.

* cited by examiner

OPTIMISING COMPUTER PROGRAM CODE

CROSS REFERENCE TO RELATED APPLICATIONS

This is the U.S. National Stage of International Application No. PCT/GB2022/050377, filed Feb. 11, 2022, which was published in English under PCT Article 21(2), which in turn claims the benefit of Great Britain Application No. 2101977.3, filed Feb. 12, 2021.

BACKGROUND OF THE INVENTION

The present invention relates to methods, apparatus and software for optimising computer program code.

When a computer program is written, the computer program is written as source code in a programming language. A compiler is a software program that translates the source code into object code or bytecode, which can then be executed or interpreted by a computer processing system. During compilation, a compiler may perform various optimisations to improve the efficiency of its output—e.g. to reduce its memory footprint or to make it execute more efficiently.

Conventional compilers provide good optimisations for procedural computer program code (e.g. FORTRAN, BASIC, C), but have difficulty when optimising object-oriented program code (e.g. Java™, C++, Python™)

The present invention seeks to provide novel approaches for optimising object-oriented computer programs.

SUMMARY OF THE INVENTION

Viewed from a first aspect, the invention provides a computer-implemented method for optimising object-oriented program code, the method comprising:

receiving object-oriented program code;

performing a static analysis on a call of the object-oriented program code to simulate an effect of the call on an abstract state, and generating static-analysis data representative of the effect of the call on the abstract state;

introspectively accessing an object graph, generated from the program code, to determine a property of the call; and generating optimised program code from the received object-oriented program code, wherein generating the optimised program code comprises using the static-analysis data and the determined property to optimise the call in the optimised program code.

Viewed from a second aspect, the invention provides a computer processing system for optimising object-oriented program code, the computer processing system comprising a processor and a memory storing computer software for execution by the processor, wherein the computer software comprises instructions which, when executed by the processor, cause the processor to:

receive object-oriented program code;

performing a static analysis on a call of the object-oriented program code to simulate an effect of the call on an abstract state, and generate static-analysis data representative of the effect of the call on the abstract state;

introspectively access an object graph, generated from the program code, to determine a property of the call; and generate optimised program code from the received object-oriented program code, wherein generating the optimised program code comprises using the static-analysis data and the determined property to optimise the call in the optimised program code.

Viewed from a third aspect, the invention provides computer software for optimising object-oriented program code, the computer software comprising instructions which, when executed by a processor, cause the processor to:

receive object-oriented program code;

performing a static analysis on a call of the object-oriented program code to simulate an effect of the call on an abstract state, and generate static-analysis data representative of the effect of the call on the abstract state;

introspectively access an object graph, generated from the program code, to determine a property of the call; and generate optimised program code from the received object-oriented program code, wherein generating the optimised program code comprises using the static-analysis data and the determined property to optimise the call in the optimised program code.

Thus it will be seen that, in accordance with embodiments of the invention, object-oriented program code is optimised using introspection of an object graph, rather than by static code analysis alone. By examining objects at runtime, using introspection, runtime information can be determined that may then be used, in combination with static-analysis data, to resolve statements in method and function calls that it would not be possible to resolve using static analysis alone, thereby embodiments to optimise code more effectively.

Such use of the object graph may also, at least in some embodiments, enable types of optimisation to be used that are not conventionally applied to object-oriented programs.

The runtime analysis may, at least in some embodiments, be seen as determining the "transitive closure" of concrete methods and instance fields that will be utilised by the optimised program. Determining properties from the object graph may be done in various ways. Some embodiments identify and store paths to entities in the object graph, as disclosed in more detail below, but other embodiments may use different approaches.

The received object-oriented program code may be source code, which may be in a high-level programming language, such as Java™ or C++, or intermediate representation (IR) code, or bytecode or machine code. The optimised program code may be optimised source code, or optimised intermediate representation (IR) code, or optimised bytecode (for interpretation at runtime, or for ahead-of-time or just-in-time compilation), or optimised machine code. Some embodiments may generate a plurality of optimised program codes, of different types, from the same received program code (e.g. a first version as optimised Java™ bytecode, and second version, providing some or all of the same functionality, as optimised OpenCL C code). The software may output the optimised program code to a compiler (e.g. to a back-end compiler), or the software may comprise a compiler for compiling the generated optimised code. The software may output compiled code (i.e. in a different format to the received code), or a compiled executable. In some embodiments, the software receives IR and outputs machine code; in some embodiments, it receives bytecode and outputs optimised bytecode. In some embodiments, the optimised program code comprises executable code for execution, at least in part, by a graphics processing unit, GPU. The computer processing system may comprise a graphics processing unit, GPU, for executing the optimised program code.

The call may be a method call or a function call. It may be a call to a method, such as to a Java™ or C++ method, or a call to a function, such as to a C++ function or lambda function.

In one preferred set of embodiments, the object-oriented program code comprises instructions for querying a database—preferably a relational database. The program code may comprise instructions for interacting with, or for implementing a component of, a relational database management system (RDMS). It may comprise instructions for processing one or more relational algebra expressions. It may comprise or implement a query language instruction, such as a Structured Query Language (SQL) statement.

The static analysis of the code may be performed on just a single call, but is preferably performed on a plurality of calls in the object-oriented program code. It is preferably performed on every call (or every method call and/or every function call) in the program code. This can enable high levels of optimisation. The static analysis may be performed on one, some or all static methods and/or object methods. The static analysis may be performed on one, some or all constructors of the program code.

The abstract state may comprise a simulated local memory. It may simulate a stack and/or a set of local registers. It may comprise a data structure for storing stack memory locations and/or local-register memory locations. Simulating the effect of the call on the abstract state may comprise initialising the simulated local memory of the abstract state with a parameter of the call, which may be an argument for the call. Simulating the effect of the call may comprise determining the cumulative effect of one or more statements (e.g. all of the instructions) in a body of the call (e.g. in the body of a method or function called by the call), on the abstract state—e.g. on the simulated local memory. Generating the static-analysis data may comprise storing, in the static-analysis data, a state of the simulated local memory after the cumulative effect of said one or more statements (i.e. storing data representative of the abstract state).

At least in some embodiments, arrays may be considered as objects. References herein to fields may encompass array elements.

Simulating the effect of the call on the abstract state may comprise identifying that a statement in the called body comprises a field access. The field access may access a field of a non-array object or class, or may access an element of an array. Generating the static-analysis data may comprise storing, in the static-analysis data, a path to the accessed field in the object graph. It may comprise storing a type of the field access, in the static-analysis data. The path may be stored as an Object-Graph Navigation Language (OGNL) path, or using any other appropriate representation.

Simulating the effect of the call on the abstract state may comprise identifying that a statement in the called body comprises a sub-call. Generating the static-analysis data may comprise determining an input parameter of the call, or of such a sub-call, from the simulated local memory of the abstract state, and storing a path to a body of the call or sub-call (e.g. a method or function called by the called) in the static-analysis data, and/or storing a path to the input parameter of the sub-call. In some instances, the sub-call may be in an object constructor.

Simulating the effect of the call on the abstract state may comprise identifying that a statement in the called body comprises a constant value. Generating the static analysis data may comprise storing, in the static-analysis data, a path to the constant value. It may further comprise storing the type of the constant value, in the static-analysis data.

Simulating the effect of the call on the abstract state may comprise identifying that a statement comprises an operator for creating a new object (e.g. is a "new" operator). The "new" operator may relate to a non-array object (i.e. a class instance) or to an array. Generating the static-analysis data may comprise storing the type of object to be created by the new operator in the static-analysis data.

Simulating the effect of the call on the abstract state may comprise identifying that a statement is a return statement. Generating the static-analysis data may comprise storing a type of a return variable of the return statement, and/or a path for the return variable, in the static-analysis data.

The static analysis may be performed before executing the program code, or it may be performed during runtime of the program code, e.g. ad hoc during execution. Generating and storing the static-analysis data (e.g. containing path elements as described herein), can advantageously avoid the need to re-analysing the same method over and over again during runtime.

The software may receive or access data representative of the object graph (e.g. from a memory or from other software). The software may comprise instructions for generating the object graph. It may generate the object graph while interpreting or executing the received program code—i.e. at runtime. It may generate the object graph by bootstrapping the received program code. The software may identify or receive a root object of the object graph, and optionally one or more root methods. It may comprise instructions for introspecting the object graph to examine the type and/or value and/or class and/or other property of any object or method in the object graph. The software may, in some embodiments, obtain runtime-type-information (RTTI) by introspecting the executing object-oriented program code. It may access the object graph using a reflection interface (e.g. a Java™ Reflection API) in order to determine one or more properties of the call.

The determined property of the call may be a type or a value or a class of an input parameter (e.g. an argument) of the call, or of a field or variable within the call, or of a newly created object, or of a return of the call. The software may introspectively access the object graph to determine a plurality of properties of the call, for at least one or more calls in the received program code.

Generating the optimised program code may comprise processing the static-analysis data and the determined property to determine (e.g. create or populate) reachability data for the received object-oriented program code. This reachability data may comprise reachability data for the call (and optionally for a plurality of other calls). The reachability data may be generated using a recursive process that analyses one or more or all method calls (and/or function calls) of the received program code. The recursive process may comprise a search through the method and/or function calls of the received program code, which may start from a root or entry method. In some preferred embodiments it is a depth-first search, although in other embodiments a breadth-first search may be performed.

Generating the optimised code may then comprise analysing the reachability data, preferably in order to determine where (i.e. one or more locations) and/or how to optimise the program code—e.g. where to perform one or more of: de-virtualisation, field access parameterisation, inlining, reduction or elimination of autoboxing, reduction of new object creation (e.g. by replacing suitable "new" operators with pre-created objects), and/or irrelevant-code removal.

The optimised code may be generated by modifying a copy of the received program code.

Determining the reachability data for a call may comprise identifying a field access in a body of the call (i.e. of a called method or function). The field access may be an access of a field of a non-array object, or may be an access of an element of an array. It may comprise processing the static-analysis data to determine a path to the accessed field in the object graph. It may comprise storing data representative of the field path in a reachability data structure. It may further comprise processing the static-analysis data to determine a type of the field access and storing data representative of the type of the field access in the reachability data structure.

Generating the optimised program code may comprise determining a value of a field by introspecting (i.e. introspectively accessing, or interrogating) the object graph using a field path. The field may be a field of a non-array object or may be an array element. It may comprise determining a status of a field from the reachability data. The status may represent whether the field is immutable (i.e. only ever read and never written to), and/or whether the field is ever used outside the current call, and/or whether the field is externally modifiable (i.e. accessed by reference). It may comprise replacing a field access in a body of the call in the received code with the determined value of the field in a body of a corresponding call in the optimised code. This replacing may be contingent on the determined status of the field.

Determining the reachability data for a call may comprise identifying the creation of a new object in a body (i.e. of a called method or function or constructor). It may comprise processing the static-analysis data to determine a type of the newly created object and storing data representative of the type of the new object in the reachability data structure. It may comprise determining a status of a newly created object from the reachability data. The status may represent whether the newly created object is stored in a field of an object, which may be an array.

Determining the reachability data may comprise identifying an input parameter (i.e. an argument or other parameter) of the call, or of a (sub-)call in a body of the call (e.g. of a called method or function). It may comprise processing the static-analysis data to determine a path to a body of the call in the object graph. It may further comprise processing the static-analysis data to determine a path to an input parameter of the call, in the object graph. It may comprise storing data representative of the call path and/or the input-parameter path in a reachability data structure. The method may comprise storing reachability data for the call in the reachability data for the received program code—e.g. by extending a reachability data structure. It may comprise storing, in the reachability data for the program code, reachability data for each a plurality of calls and/or sub-calls of the received program code.

The call may be a sub-call within a called method or function. It may be any number of calls down from an entry method of the program code.

The software may comprise instructions for de-virtualising the received program code. This may comprise a recursive process. Generating the optimised program code may comprise determining, using the reachability data, that a call does not comprise any sub-calls. It may comprise, in response to this, determining a type of the call and/or a type of an input parameter and/or of return of the call, by introspecting the object graph. It may comprise using the type or types to de-virtualise the call in the optimised code. It may comprise converting a method call in the received code to a static method in the optimised code; this may comprise changing one or more method parameters and return types.

Generating the optimised program code may comprise determining, using the reachability data, that all field accesses in a call are field read accesses. It may comprise, in response to this, determining a value of an input parameter of the call by introspecting the object graph. It may comprise determining a status of the input parameter from the reachability data. It may comprise evaluating a return value of the call from a value of the input parameter, and replacing the call in the received program code with the evaluated return value in the optimised code.

Generating the optimised program code may comprise determining, using the reachability data, that a plurality of field accesses in a call are to a common field. It may comprise, in response to this, determining that the plurality of field accesses are field read accesses. It may comprise configuring an optimised call in the optimised code to provide the field value as an input parameter of the optimised call, and setting the field read accesses in the body of the optimised call to be references to the (local) input parameter.

Generating the optimised program code may comprise identifying a loop statement or a conditional statement in a body of the call. It may comprise processing the static-analysis data to determine a path in the object graph to a control variable of the loop statement or of the conditional statement. It may comprise resolving the control variable by introspecting the object graph using the path. It may comprise using the resolved control variable to unwrap the loop statement or the conditional statement in the optimised code (e.g. in an optimised called method).

Determining the reachability data may further comprise receiving a constraint parameter (e.g. from a user such as a software developer), and adjusting the reachability data by fixing a status of at least one of a field, an object or a variable with the constraint parameter.

Generating the optimised program code may comprise determining a status of a return variable of a call from the reachability data. It may comprise identifying one or more statements in a method or function called by the call that do not influence the return variable. It may comprise omitting the identified one or more statements from a corresponding optimised method or function in the optimised code.

Generating the optimised program code may comprise determining from the reachability data that a field in the received program code is never read after execution of the received program code. It may comprise assigning such a field a "not relevant" status. It may comprise omitting one or more statements involving the field in the optimised program code.

Generating the optimised program code may comprise determining from the reachability data that a field value in the received program code is immutable, and, in response, inlining the field value in the optimised program code.

Generating the optimised program code may comprise reducing autoboxing. This may be done partially or wholly (i.e. partial or complete elimination of autoboxing). This may be performed using peephole optimisation, e.g. to replace one or more instances of implicit type conversion in the received program code with explicit type conversion in the optimised program code.

Generating the optimised program code may comprise reducing new object creation. In particular, it may comprise determining from the reachability data that a newly created object, of a first type, is never stored in a field, and, in response, replacing an instruction for creating the object (e.g. a "new" operator) with a field access to a newly generated field initialised with an object of the first type. This may be done for one, or some, or all such instances in the received program code.

The processor may be a single processor core, or it may comprise a plurality of cores, which may be in a single machine or which may be distributed—e.g. networked. The processing system may comprise an interface for receiving the program code, and/or an interface for outputting the generated or compiled code, each of which may be a network interface, a data interface (e.g. a USB port), or an internal application programming interface (API). It may comprise one or more input devices such as a keyboard, mouse or touchscreen display for receiving user input. It may comprise one or more output devices such as a display screen for providing output to a user. It may comprise volatile and/or non-volatile memory for storing the software and/or for storing the received program code and/or the generated optimised program code. It may comprise software for further processing the generated optimised program code, which may include compiling, assembling, interpreting or executing the optimised code.

Computer software embodying the invention may be stored on a non-transitory computer-readable medium (e.g. a hard drive or solid-state memory), or may be encoded as a transitory signal (e.g. a radio or electrical or optical signal).

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
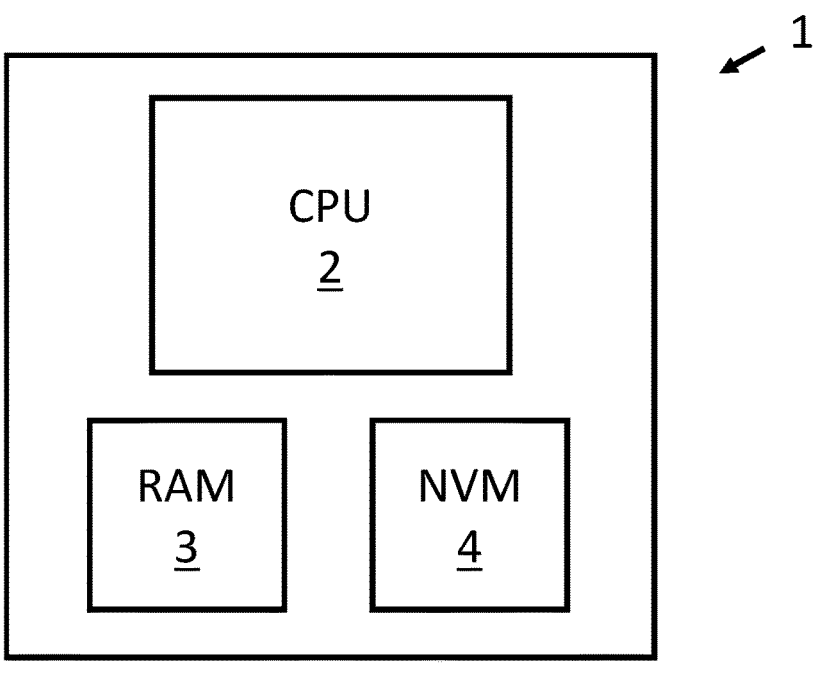
FIG. 1 is a schematic drawing of a computer system in accordance with an embodiment of the invention.

In order to provide context for the exemplary embodiments, some further detail on general compiling techniques will be provided first. This is followed by a fuller description of certain exemplary embodiments of general applicability. Finally, a detailed description of an exemplary embodiments in the field of relational database management systems (RDBMSs) is given.

Compilation Techniques

In the lifecycle of a computer program, once source code has been written, it must be compiled, e.g. translated from a higher-level program language (e.g. C++ or Java™) into a suitable lower-level instructions that can be processed or interpreted by a target system (such as a particular processor and/or operating system and/or virtual machine). Generally the compilation process can be considered as three stages: a front-end stage, a middle stage and a back-end stage.

The front-end analyses the syntax and semantics according to the specific language of the source code. The front-end transforms the input program into an intermediate representation (IR) code for further processing by the middle stage. Conventionally, this IR is a lower-level representation of the program with respect to the source code.

The middle stage can perform optimisations on the IR code that are independent of the target platform architecture. This source code/machine code independence is intended to enable generic optimisations to be shared between versions of the compiler supporting different languages and target processors. Examples of middle stage optimisations are removal of useless code (dead code elimination) or unreachable code (reachability analysis), discovery and propagation of constant values (constant propagation), relocation of computation to a less frequently executed place (e.g., out of a loop), or specialisation of computation based on the context. The middle stage produces an optimised IR that is used by the back-end.

The back-end takes the optimised IR from the middle stage. It may perform more analysis, transformations and optimisations that are dependent on the target CPU architecture.

The back-end translates the IR into the output language, which is typically the machine code for a particular processor and operating system.

This front-end/middle-stage/back-end approach, in combination with the use of an intermediate representation, makes it possible for compiler systems to be used for many different source code languages for many different target CPU architectures while sharing the optimisations of the middle stage.

Bytecode compilers are compilers that translate source code to an intermediate representation (IR) known as bytecode, instead of directly to architecture-specific machine code. Bytecode is not the machine code for any particular system, and may be portable among different computer architectures. The bytecode can be directly interpreted by a virtual machine (e.g. Java™ VM), or it may be further compiled and/or interpreted into machine code.

Ahead-of-time (AOT) compilers compile a higher-level program code or an IR code into a native machine code before execution of a program, e.g. before runtime.

Just-in-time (JIT) compilers defer compilation until the execution of a program, e.g. until runtime. JIT compilers exist for many modern languages including Python, JavaScript, Smalltalk, Java, Microsoft .NET's Common Intermediate Language (CIL) and others. A JIT compiler generally runs inside a virtual machine. Commonly, for languages such as Java™, source code is first compiled ahead of time to bytecode and the bytecode is delivered to the virtual machine for interpretation and/or execution of the bytecode, wherein the JIT compiler will dynamically compile parts of the bytecode to machine code when increased runtime performance is necessary.

Tracing compilers are a form of JIT compiler that utilise program execution traces to optimise a running program.

Optimisations of program code can be performed during the compilation to reduce one or more of: a program's execution time, memory footprint, storage size and power consumption. Conventional compilers typically provide good optimisations for procedural computer program code (e.g. FORTRAN, BASIC, C), but have difficulty when optimising object-oriented program code (e.g. Java, C++, Python).

For example, one optimisation that can be applied to an object-oriented computer program is 'de-virtualisation', in which dynamically bound function calls ('virtual functions') are converted into statically bound function calls. Performance improvements can be realized in part because the overhead accompanying dynamic dispatch is avoided. Dynamic dispatch refers to the processing that is necessary to convert a call to a virtual function into a call to a derived class that actually implements the virtual function.

In some object-oriented programming languages, mechanisms such as inheritance enable the hiding of implementations of functions. For example, in C++ a virtual function is declared in a base class but an implementation for the virtual function is not necessarily provided in that base class. Instead, one or more classes derived from the base class provide potentially-different actual implementations of the function. Inlining optimisation is typically not possible for such virtual functions, because the callee of a virtual function may often be unknown to the compiler at compile time, as there may be many different possible callees, based on different possible code execution flows to that point in the program. A virtual function is called "virtual" because a call to such a function using a pointer to the base class is typically redirected to the appropriate derived implementation depending on the true type of the object by a process called dynamic dispatch, at run-time. For example, suppose a base class (Base) has a child class (Child) that inherits from Base. A virtual function call using pointer to Base may be redirected to the child implementation in Child by dynamic dispatch. Dynamic dispatch is inefficient because a table of function pointers for the base class has to be accessed to determine the derived class to which the pointer is redirected.

Being able to devirtualize a virtual function may involve determining when a pointer to a base class will always point to a particular child class or to a small set of potential child classes. If a pointer to a base class always points to a particular child class, dynamic dispatch is unnecessary: the child implementation can be called directly. In some situations, such devirtualization may be possible by inspecting the types present in the program and determining, for example, that a base class A declares a virtual function B that is always implemented by child class C. In this case, whenever a pointer to base class A is encountered, it may be replaced by a pointer to child class C, avoiding dynamic dispatch when resolving this reference.

Performance improvements may also be realised because there can be additional opportunities for 'inlining', wherein statically bound function calls are replaced with the actual code of the called function in the compiled code. Conventional compilers for procedural code rely heavily on inlining, but this is not straightforward for object-oriented programs because deciding which functions can be inlined is difficult, particularly with virtual functions.

With AOT compilers, as the compilation is performed before runtime, optimisations of virtual functions, which depend on runtime information, are not available. JIT compilers can perform optimisations such as inlining of virtual functions in certain scenarios, but require the program to first be executed and profiled in order to obtain program traces required for effective optimisation. Tracing compilers allow de-virtualisation (and thus inlining) of virtual functions, but are reliant on the program traces and cannot achieve this efficiently utilising static analysis data.

Contrasted with the above-described compilers, at least some embodiments of the invention provide optimising software (e.g. an optimising compiler) that, when executed, generates an optimised program code from an input program code by using static-analysis data of the program and properties of an object graph representative of the source code. The optimising software may optionally perform front-end and/or back-end compilation operations, in addition to middle-stage optimisation. Alternatively it may output the optimised program code to be compiled by a separate back-end compiler.

Example Embodiments: General Use

FIG. 1 shows a computer 1, embodying the invention, suitable for executing optimising software embodying the invention. The computer 1 includes a processor (CPU) 2 that executes software from RAM 3 and/or non-volatile memory (NVM) 4 (e.g. flash or a hard drive). The software may include a conventional operating system (e.g. Android™, (OS™, Linux™ or Windows™). It may include instructions for creating virtual machines, such as Java Virtual Machines. The computer 1 and software may include other conventional components, such as busses, power supplies, user interface components, etc. which are not shown here for simplicity. The computer 1 could be a desktop computer, tablet computer, laptop computer, notebook computer, smart phone, cellular telephone, server, mainframe computer, distributed computing system, embedded device, microcontroller, and so on.

The processor 2 of the computer 1 may be configured to receive an object-oriented program code 101—e.g. by accessing the program code 101, as data, from the RAM 3. This may be from elsewhere in the computer 1, such as the RAM 3, or the processor 2 may receive it from an external location (e.g. over a wired or wireless network). Optimising compiler software 5, embodying the invention, may be executed by processor 2 to optimise and potentially compile, or partially compile, program code. It may receive source code, or intermediate representation (IR) code, or bytecode or machine code. It may output optimised source code, or optimised intermediate representation (IR) code, or optimised bytecode or optimised machine code. In some embodiments, the optimising software 5 receives IR or bytecode and outputs optimised machine code or optimised bytecode. The optimised program code may be suitable for execution by the processor 2 of the computer 1, or it may be for execution by a different computing device.

Figure 2:
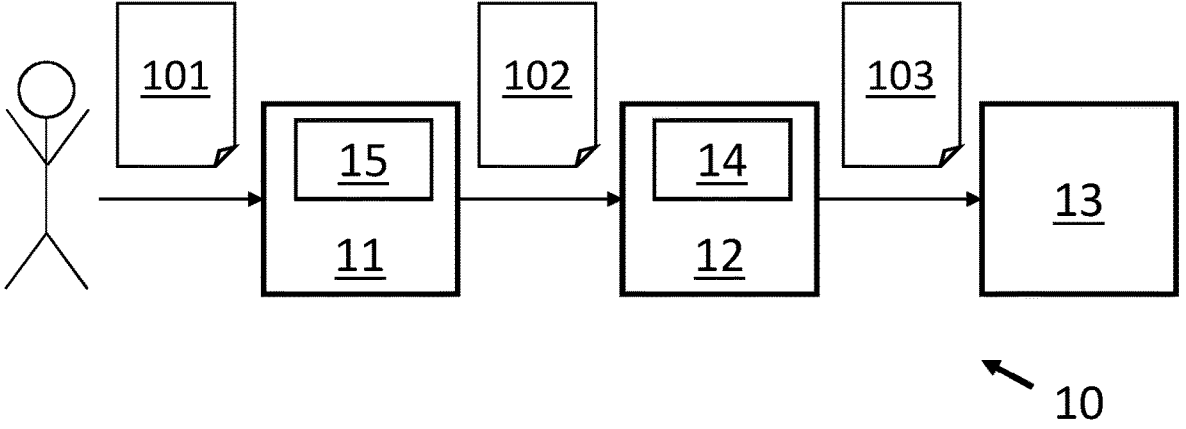
FIG. 2 is a schematic drawing of a system configured to process computer program code in accordance with an embodiment of the invention.

FIG. 2 shows a distributed processing system 10 in accordance with an embodiment of the present invention, in which the back-end compiling is performed separately from the front-end compiling and middle-stage optimisation. The processing system 10 comprises three separate computing devices 11, 12, 13, each of which may be a different computer as described with respect to FIG. 1.

In this example, the first computing device 11 is a developer computer. It receives source code 101 manually input by a software developer. It executes optimising compiler software 15 embodying the invention, as well as providing an integrated development environment (IDE). The second computing device 12 executes a back-end cross-compiler for compiling optimised program code 102, generated by the optimising software 15, to executable object code 103. The third computing device 13 is a target platform for executing the object code 103.

The IDE may allow a user (e.g. developer, programmer, designer, coder) to design, code, compile, test, run, edit, debug or build a software program, set of software programs, web sites, web applications, and web services in a computer system. The source code 101 may be created in one or more object-oriented programming languages (e.g., Java, C++, C #, Python, R, PHP, Visual Basic.NET, JavaScript, Ruby, Perl, etc.).

The computing device 11 passes the source code 101 to the optimising compiling software 15. The compilation of the source code 101 by the optimising compiler 15 generates optimised program code 102, which may be bytecode or intermediate representation (IR) code.

The second computing device 12 comprises a back-end compiler 14, which may be conventional. The back-end compiler 14 may be a cross-compiler configured to receive the optimised program code 102 (e.g. bytecode, IR code) and generate machine code 103 for the target computing device 13. The target computing device 13 is the system on which the program is to be run. Accordingly, the machine code 103 generated by the back-end compiler 14 is specific to the CPU architecture of the target computing device 13.

In other embodiments, the computing device 13 may comprise a Java virtual machine (JVM) configured to receive the optimised program code 102 as bytecode and interpret the optimised program code 102, in which case, the back-end compiler 14, and intermediate second computing device 12, are not required.

Figure 3:
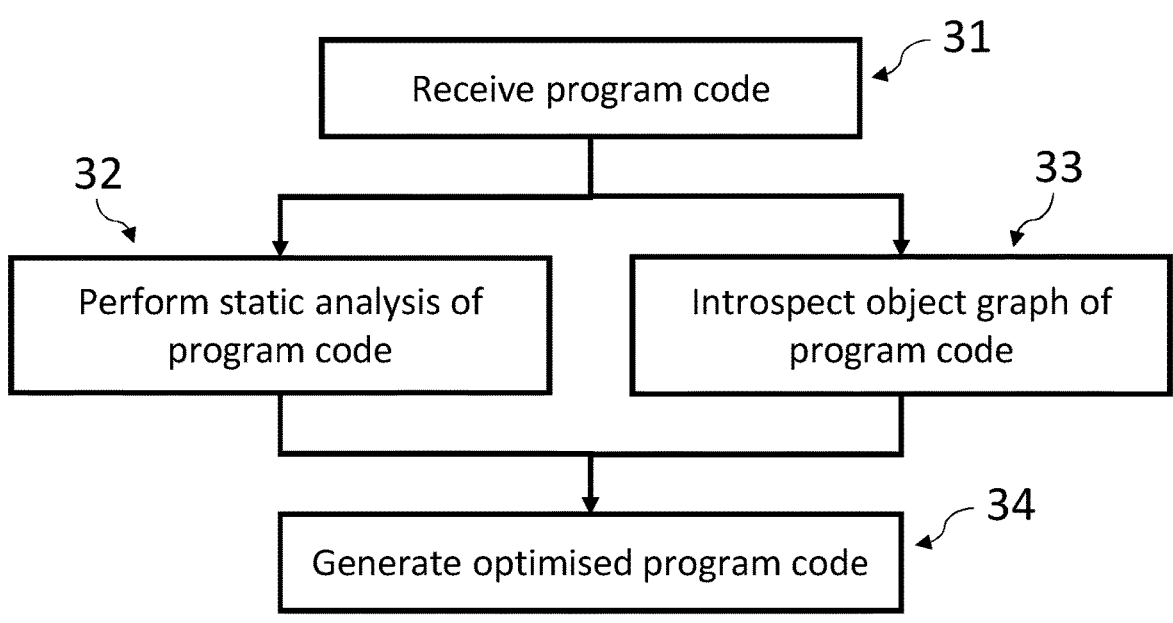
FIG. 3 is flow chart of steps carried out when generating optimised computer program code.

FIG. 3 outlines the key steps in a method of compiling and optimising computer program code as carried out by the compiling software 5, 15.

First, the compiler 5, 15 receives 31 (e.g. reads from memory) program code 101 representing an object-oriented computer program. The program code 101 may be source code, or alternatively may be bytecode or IR code (in the case where source code has been pre-compiled to generate the program code 101).

Once the compiler 5, 15 has received the object-oriented program code 101 it performs 32 a static analysis of the program code 101 in order to obtain static-analysis data. During this static analysis of the object-oriented program code 101, a respective static analysis is performed on each function and method call within the object-oriented program code 101.

The compiler 5, 15 also introspectively accesses 33 an object graph, generated from the program code. This may be performed simultaneously—e.g. in parallel—with the static analysis process 32, or later in time.

Data from the static analysis and the object graph introspection are both used to generate optimise program code 34.

Figure 4:
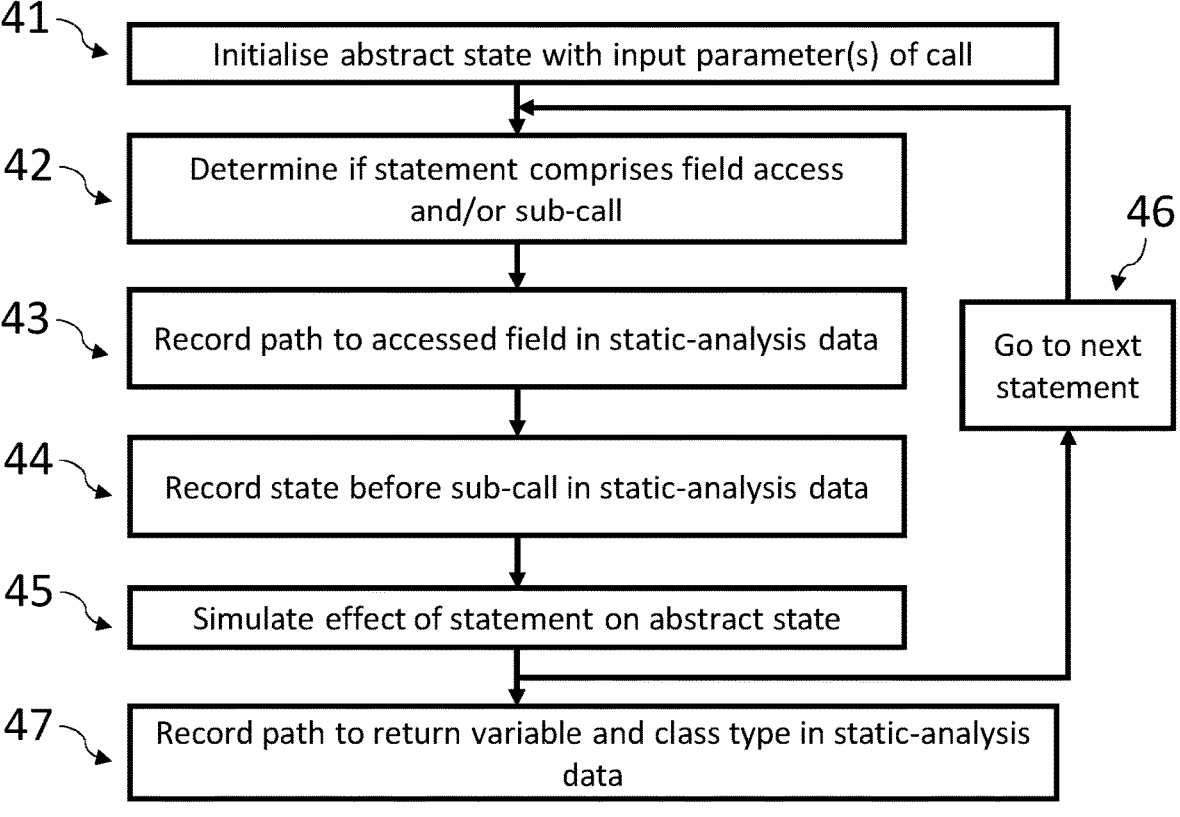
FIG. 4 is flow chart of steps carried out when performing static analysis on code of a computer program.

FIG. 4 outlines the steps of an exemplary process of performing static analysis 32, exemplified here by considering a call in the object-oriented program code 101.

First, an initial abstract state is generated 41, the abstract state comprising a simulated local memory, for example storing stack memory locations and unlimited local-register memory locations. The abstract state can be represented in a suitable data structure that is stored in the memory 3, 4 of the computer 1.

Using this abstract interpretation approach, the abstract semantics of the computer program (e.g. the mathematical characterisation of possible behaviour(s) of the program) may be derived in the manner below. The abstraction of the static analysis may be increased as required to make the semantics decidable, but at the cost of a loss of precision. In general, the compiler 5, 15 is configured to strike a balance between the precision of the static analysis and its decidability (e.g. computability), as well as the computational cost (e.g. tractability).

During the static analysis of a function or method call, the process comprises stepping through each statement in the code body of the call in order to model (e.g. simulate) the effect of each statement on the abstract state (e.g. by recording what parameters are written to the stack and to the local registers by each statement), and thus determine an approximation of the cumulative effect and/or return output of the call.

The process comprises determining 42 if a statement in the code body of the call comprises a field access or a sub-call.

In generating static-analysis data, for each field (i.e. member) access in the call, the static analysis may record 43 the type of access (e.g. read or write) and a path to (e.g. address of) the field in an object graph (to be generated from the program code during runtime, see below). For example, the path may be an Object-Graph Navigation Language (OGNL) path. Similarly, for each sub-call of the function or method call, the static analysis may record 44 the sub-call and its input variables. The values of the input variables may be derived (e.g. determined or captured) by recording the state of the abstract machine at the point where the sub-call is called in the code body of the call (e.g. the sub-call environment). The static analysis may also record the value of the program statement counter for the statement comprising the sub-call.

After simulation 45 of the effect of the present statement, the analysis proceeds 46 to the next statement.

At the end of the static analysis, the concrete class type of the return variable(s) of the call, and a path to the return variable in an object graph (e.g. an Object-Graph Navigation Language path), are recorded 47.

The static analysis 32 may be performed at any time after the program code of the object-oriented program has been received. If the optimising compiler 5, 15 receives source code, the static analysis may be performed directly on the source code. Alternatively, the compiler 5, 15 (or a conventional back-end compiler) may have pre-compiled the source code and the static analysis may be performed on object code, bytecode or IR code, for example. It may be performed before execution of the object-oriented program, or it may be performed during runtime, in a just-in-time approach.

Returning to FIG. 3, the method of compiling and optimising computer program code also comprises a process of introspectively accessing 33 an object graph, generated from the program code, in order to determine a property of a call of the program code.

An object graph representing the object-oriented program code is generated during bootstrap stage of runtime. In some embodiments, after the object graph is constructed during bootstrapping, a root object of the object graph is passed to the compiler 5, 15, along with any root methods. The compiler 5, 15 is thus able to introspect the object graph to examine the type, class or other property, of an object or a method found within the object graph.

Thus, runtime-type-information (RTTI) may be obtained by the compiler 5, 15 by examining (i.e. introspecting) the executing object-oriented program code. For example, the compiler 5, 15 may utilise a reflection API in Java in order to obtain this information. Alternatively, the object graph could be generated in advance of executing the compiler 5, 15, rather than executing the program code in parallel with the compiler 5, 15. In this case, the object graph may be transmitted to the compiler 5, 15 in a suitable data format (e.g. XML (Extensible Markup Language), JSON (JavaScript™ Object Notation)) or as a serialised byte stream.

Figure 5:
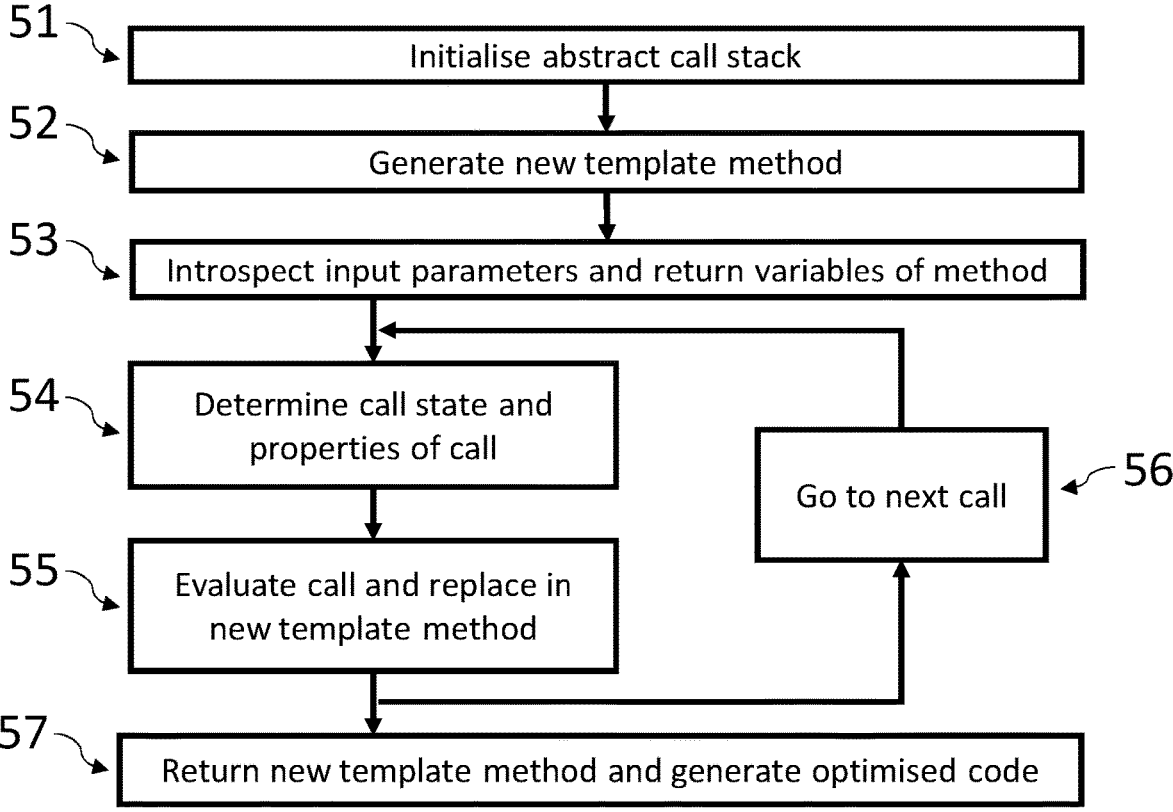
FIG. 5 is flow chart of steps carried out when introspecting an object graph associated with a computer program.

With reference to FIG. 3 and FIG. 5, a process of generating 34 optimised program code for each root method of the program code passed to the compiling software 5, 15 proceeds in the following manner. First, the static-analysis data of the root method (which may have been acquired from static analysis performed beforehand, or from static analysis performed parallel with the introspection of the object graph) is utilised to initialise 51 an abstract call stack comprising the root object and the input parameters of the root method.

Second, a template of the 'new' method is generated 52 from the root method code. The type of each input parameter and the type of each return variable may be introspectively determined 53 from the object graph and resolved for the new template method.

As detailed above, the static analysis data of the root method will comprise a record of each method call in the code body of the root method. Thus, for at least one of these method calls, the path to the method in the object graph is followed and a type of the called method is determined 54 (e.g. resolved) by introspection. Additionally, the path to a field in the object graph, wherein the field is accessed by the method to obtain a value of an input variable, can be followed to introspect and determine 54 (e.g. resolve) a property (e.g. type, value) of the input variable.

Each called method in the code body of the root method may thus be analysed (e.g. evaluated) 55 using the determined type of the called method, and the determined property of the input variable, and the call be replaced in the of the new template of the root method by its resolved or evaluated form.

If the method is to analyse another call in the code body, the method may proceed 56 to the next call.

The new root method template, comprising the new method calls, can then be processed (and optionally compiled to a lower-level representation) 57 to generate an optimised program code for the root method. This optimised program code may be optimised bytecode, optimised IR code, or optimised machine code.

The generated optimised assembly may be suitable for execution. Alternatively, the generated optimised assembly may be passed to a back-end compiler to be further compiled.

In order to further explain and expand upon the above-described method, some examples of how optimising compilers embodying the invention, such as the compilers 5, 15, may operate are now provided. The examples presented are shown in terms of source code (written in Java or C++), and the effects of the analysis and compilation steps are also represented in terms of source code, for ease of human comprehension (as bytecode and IR code would make limited sense to a human reader). However, these examples are merely for purposes of explanation, and while parts of the compilation method of the present embodiments may be conducted on source code (e.g. the static analysis), it is also envisaged that in some embodiments the compilation software analyses and optimises bytecode or IR code and outputs bytecode, IR code or machine code.

Example Code

Consider the following code, written in the object-oriented programming language C++:

```
class Expression {
public:
    virtual int scale(int value) = 0;
    virtual int op(int a, int b) = 0;
}
class Adder: public Expression {
public:
    Expression* rhs_scale_op;
    Expression* get_rhs_scale_op( ) {
        Expression* toReturn = this->rhs_scale_op;
        return toReturn;
    }
    virtual int scale(int value) {
        return value;
    }
    virtual int op(int a, int b) {
        int rc0 = this->scale(a);
        int rc1 = this->get_rhs_scale_op( )->scale(b);
        return rc0+rc1;
    }
}
class ScalingAdder : public Adder {
public:
    virtual int scale(int value) {
        return value * 100;
    }
}
Expression* createProgramA( ) {
    Adder* exp = new Adder( );
    exp->rhs_scale_op = new ScalingAdder( );
    return exp;
}
Expression* createProgramB( ) {
    Adder* exp = new ScalingAdder( );
    exp->rhs_scale_op = new Adder( );
    return exp;
}
int main(int argc, char** argv) {
    Expression* progam = nullptr;
    if (argc < 3) {
        program = createProgramA( );
    } else {
        program = createProgramB( );
    }
    Expression* optimised_program =
    OOC::compile<Expression>(program, "Expression");
    int rc = optimised_program->op(1, 2);
    cout << rc;
    delete optimised_program;
}
```

Figure 6:
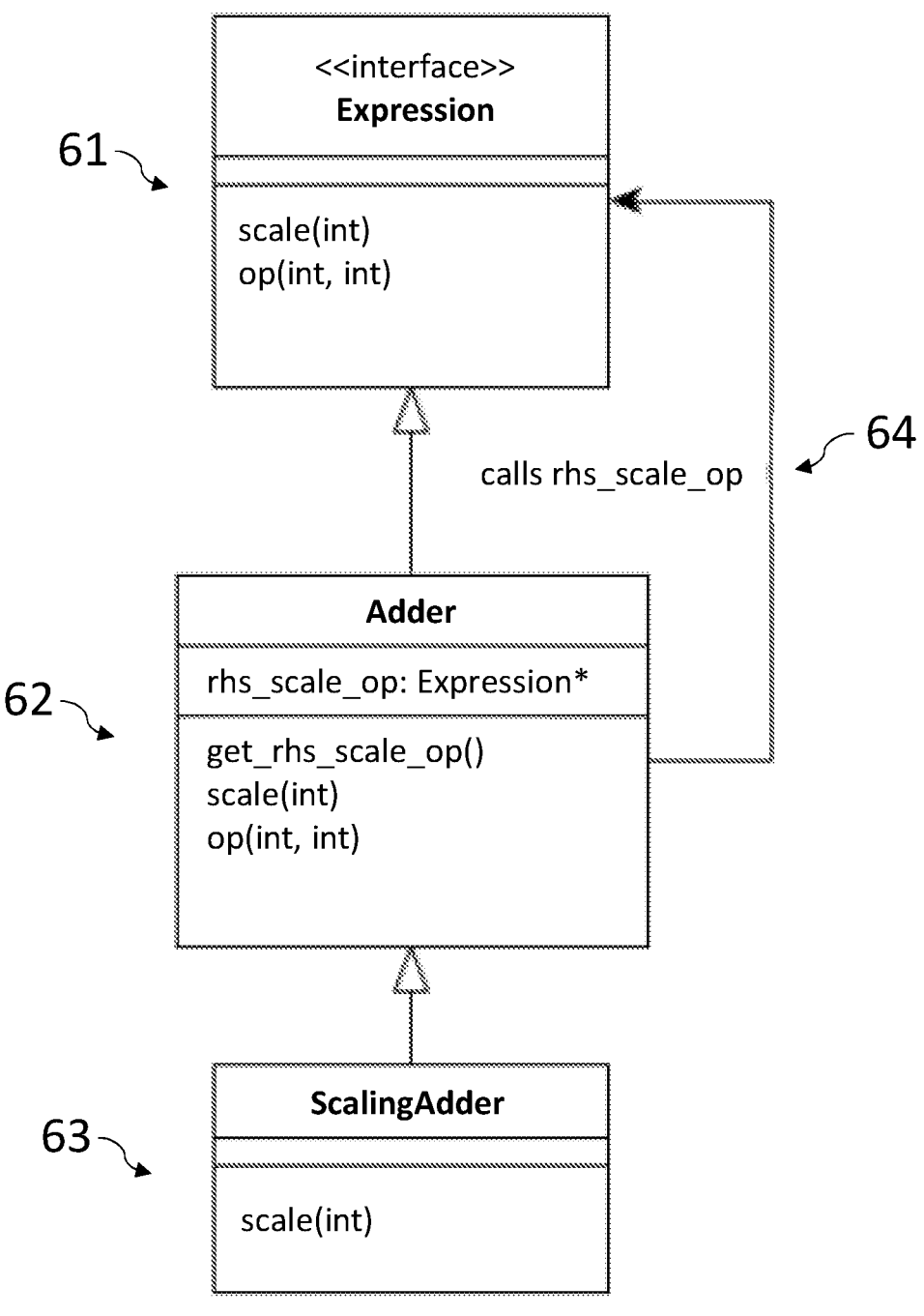
FIG. 6 is an example class diagram on which methods embodying the invention may be performed.

In the example source code reproduced above, and with reference to the class diagram as shown in FIG. 6, the class Expression 61 is the base class ("class Expression {"). Class Expression 61 has two virtual functions called scale ("virtual int scale(int value)=0;") and op ("virtual int op(int a, int b)=0;"). The notation "scale(int value)=0" means that the function "scale" does not provide an implementation (i.e., scale is a pure virtual function). The line "class Adder: public Expression {" means that class Adder 62 derives from the public class Expression 61. Class Adder 62 is a subclass of class Expression 61.

In class Adder 62, the class functions scale and op are redefined (i.e. the functions are 'overridden'). Class Adder 62 also initialises the object rhs_scale_op, of base class type Expression 61, and calls 64 a method on the object rhs_scale_op.

The line "class ScalingAdder: public Adder {" means that class ScalingAdder 63 derives from the public class Adder 62. Class ScalingAdder 63 is a subclass of class Adder 62 (and thus, by extension, also a subclass of class Expression 61). Class ScalingAdder 63 defines its own scale function, thus overriding the definition of the function as inherited from Adder 62.

Instances of the Expression class 61 are subsequently created in the sections of the source code createProgramA( ) and createProgramB( ). In the main body of the code, one of these programs is selected depending on a value of "argc", and the optimising compiler ("OOC") compiles the selected program to an optimised program, of which the function "op(1, 2)" is executed and the result printed.

In the first scenario (if argc<3), the program to be optimised is ProgramA( ). In ProgramAQ, the object exp is created as an instance of the Adder class 62, and the line "exp→rhs_scale_op=new ScalingAdder( )" assigns a new instance of the ScalingAdder class 63 to be pointed to by rhs_scale_op of the object exp.

In line with an embodiment of the present invention, during the optimising compilation, static-analysis data of the program code is utilised to initialise an abstract call stack (i.e. a record of the call history) with the root object and its parameters, e.g. call stack=[Adder::op(int, int)].

Next, a new method is created by using the current method as a template, e.g. Methods=[op_1]. The function parameter and return variable types can be adjusted (e.g. fixed) by using the static-analysis data, e.g. op_1: =int op_1 (Adder* self, int a, int b).

Then, the code body of the template method can be further inspected and analysed. For example, consider the sub-call "this→scale(int)" that is called within Adder::op(int, int). From the static-analysis data, the state passed to the call is known, and by introspecting the object graph at runtime, the called method can be resolved to be of type Adder. Thus the call "this→scale(int)" can be replaced with the method returned by the analysis: int scale_1 (Adder* self, int).

This processing can occur for one, more or each sub-call within the body of the new templated method. In this way, code can be generated for the new templated method(s):

```
int op_1(Adder* self, int a, int b) {
    int rc0 = scale_1(self, a);
    int rc1 = scale_2( get_rhs_scale_op_1(self), b);
    return rc0+rc1;
}
ScalingAdder * get_rhs_scale_op_1(Adder* self) {
    ScalingAdder* toReturn = ( ScalingAdder*) self->rhs_scale_op;
    return toReturn;
}
int scale_1(Adder* self, int value) {
    return value;
}
int scale_2(ScalingAdder* self, int value) {
    return value * 100;
}
class GeneratedExpression1: public Expression {
public:
    Adder* self;
    virtual scale(int value) { return scale_1(self, value); }
    virtual int op(int a, int b) { return op_1(self, a, b); }
}
```

Subsequently this code can be optimised:

```
class GeneratedExpression1: public Expression {
public:
    Adder* self;
```

-continued

```
        virtual scale(int value) { return value; }
        virtual int op(int a, int b) { return a+(b*100); }
    }
```

Further optimisations available as a result of the compiling software are explored below. For example, consider the following program code (written in Java):

```
interface Animal {
    public int getNumberOfFeet( );
}
class Cat implements Animal {
    int getNumberOfFeet( ) {
        return 4;
    }
}
class Task implements Runnable {
    Animal animal;
    public void run( ) {
        System.out.println( animal.getNumberOfFeet( ) );
    }
}
public static void main(String args[ ]) {
    //construct the object graph of the program
    Task task = new Task( );
    task.animal = new Cat( );
    //optimise
    Runnable optimisedTask = OOC.compile(task, Runnable.class);
    optimisedTask.run( );
}
```

The class Cat implements the interface Animal. Interface Animal is an abstract class that has a virtual method 'getNumberOfFeet( )', the body of which may be defined differently by each (sub)class, e.g. as shown, the function getNumberOfFeet( ) is implemented in Cat by returning the integer '4'.

By performing the above-described method, the code can thus be de-virtualised in order to provide the opportunity for optimisation:

```
class OptimisedTask implements Runnable {
    Cat animal;
    public void run( ) {
        System.out.println( getNumberOfFeet1(animal) );
    }
    static int getNumberOfFeet1(Cat cat) {
        return 4;
    }
}
```

Similarly, the compiling software 5, 15 may also be configured to encourage devirtualisation. For example:

```
int getNumberOfFeet(Animal first, Animal second, boolean useSecond) {
    Animal toUse = first;
    if (useSecond) {
        toUse = second;
    }
    return toUse.getNumberOfFeet( );
}
``` can be resolved to:

```
int getNumberOfFeet(Animal first, Animal second, boolean useSecond) {
    if (useSecond) {
        return second.getNumberOfFeet( );
```

-continued

```
    } else {
        return first.getNumberOfFeet( );
    }
}
```

The compiler may also be configured to eliminate field accesses (e.g. inline) where possible, e.g. modifying the code:

```
class Cat {
    int weight;
    int getWeight( ) {
        return weight;
    }
}
int getWeight(Cat c1, Cat c2) {
    return c1.getWeight( ) + c2.getWeight( );
}
class Task implements Runnable {
    Cat c1;
    Cat c2;
    public void run( ) {
        System.out.println( getWeight(c1, c2) );
    }
}
public static void main(String args[ ]) {
    //construct the object graph of the program
    Task task = new Task( );
    task.c1 = new Cat( ); task.c1.weight = 100;
    task.c2 = new Cat( ); task.c2.weight = 200;
    //optimise
    Runnable optimisedTask = OOC.compile(task, Runnable.class);
}
``` to:

```
class OptimisedTask {
    Cat c1;
    Cat c2;
    public void run( ) {
        System.out.println( getWeight1( c1, c2 ) );
    }
    static int getWeight_1(Cat c1, Cat c2) {
        return 100 /* weight from c1 */ + 200 /* weight from c2 */;
    }
}
```

Another beneficial optimisation available when implementing the present method includes loop unrolling. Consider the source code:

```
void execute(List tasks) {
    for (Runnable r: tasks) {
        r.run( );
    }
}
```

The object 'tasks' is an implementation of the interface List. During runtime, tasks will have been generated as an array of objects in the object graph. In generating an optimised version of the above code, the path to the list in the object graph may be introspected in order to determine the size of the array. Thus the loop can be safely unrolled without loss of information, e.g.:

```
void execute(List tasks) {
    tasks.get(0).run( );
    tasks.get(1).run( );
    tasks.get(2).run( );
}
```

As should be recognised, the advantages of such an optimised code are realised during execution. Particularly, in addressing the technical limitations surrounding the optimisation of object-oriented program codes, the present invention provides improved processing speed and reduced memory usage. When implemented on a general-purpose computer, the present method improves the functioning of the computer by enabling the processor of the computer to perform tasks or instructions in a more efficient manner.

The next section describes the application of methods embodying the invention to the more specific task of developing and executing programs in relational database management systems (RDBMS).

Example Embodiments: RDBMS Context

In relational database management systems (RBDMSs), structured query language (SQL) is used to query data from tables. Modern RDBMSs use columnar storage for more efficient query processing and in recent times graphics processing units (GPUs) are used in RDBMSs to offload query processing in order speed up query executions. SQL is a declarative language and it is at the discretion of the RDBMS to implement the SQL features as it sees fit. RDBMSs are traditionally implemented in C/C++ as this allows writing and compiling code optimised for specific hardware.

SQL statements can generally be broken up into more basic relational algebra (RA) statements.

For example, in SQL, the statement:

SELECT*FROM table WHERE table.a>100;

can be broken up into the RA statements:

SCAN table

FILTER expression: table.a>100

PROJECT *

Traditionally the expressions in the RA are translated into an abstract syntax tree (AST) and then compiled to an executable program. This executable program can be an object graph ready for execution or, more recently, can be just-in-time (JIT) compiled code.

Object graphs are much easier to develop and test in a high level OO language, but suffer from performance issues in the context of RDBMSs. JIT compilation of RA statements allows much faster and more efficient processing of the RA expressions, but JIT compiling of RA statements is conventionally difficult and error prone. The embodiments described below address these challenges.

In the following exemplary embodiments, the optimising software takes a fully developed object-oriented program, then compiles and optimises it further than conventional methods, for improved performance.

In some embodiments, assuming the object-oriented program code is written in Java™ and executed as bytecode in a Java™ virtual machine (JVM), the following steps are performed:

1. Frontend compiler receives RA (procedural) code, and generates object-oriented program code, including an object graph (i.e. a bootstrapping phase)

2. An analyser component of the present embodiment receives the object-oriented program code and
   a. generates static-analysis data
   b. caches the static-analysis data per class method 3. A compiler component of the present embodiment uses the static-analysis data and runtime information obtained via introspection of the object graph, to generate an optimised object-oriented program, and a. compiles the optimised code to JVM (thus allowing all JVM features, e.g. virtual/native calls etc.)

b. cross compiles the optimised code i. using an LLVM™ compiler 1. to host-CPU machine code (this allows recursion, as a thread call stack is available), and/or 2. to Parallel Thread Execution (PTX) architecture, for passing to a Compute Unified Device Architecture (CUDA) platform (this has no thread call stack available, so the object-oriented code needs to be optimised maximally), and/or 3. to Standard Portable Intermediate Representation (SPIR-V), and then to a. Vulkan 1.1, and/or b. Open Computing Language (OpenCL) versions 2.0 or above, and/or ii. to OpenCL C, for OpenCL versions below 2.1

Thus it will be seen that these methods and software provide generalisation and optimisation advantages. Conventional compilers work on ASTs and either compile to object-oriented programs or JIT-compile the ASTs to executable code. Conventional compilers may then perform several optimisations on the AST itself (e.g. constant folding, sub-expression elimination, dead code elimination etc.) before passing it down to the AST compilers; e.g. using the flow:

Parser→[AST]→AST Optimiser→[Optimised AST] →AST Compiler→[Program]

By contrast, the present approach eliminates any dependency on ASTs; i.e. using the flow:

Parser→[OO Program]→Optimising Compiler Software- →[Optimised Program]

A specialised parser, which may form part of the optimising compiler software, is configured to generate an executable object-oriented program directly from an RA expression (like "A<100"). The generated object-oriented program is directly executable, but is slow.

Thus, all the optimisations that might conventionally be applied by AST Optimisers and AST Compilers are instead here performed by the optimising compiler software directly on the OO program. In this way the process adheres to the Java™ paradigm of "write once and execute everywhere" (e.g. as applicable for JVMs, CPUs, GPUs).

In contrast to conventional compilers, the optimising compiler software of the present embodiment receives an OO program (which can be considered an object itself), instead of an AST, as input for its optimisations. This means that it can also be used to optimise other code, in addition to OO programs representing SQL expressions. For example, the optimising compiling software can also be used to optimise algorithms such as TimSort, QuickSort, Merge-Sorts, HashJoin etc., as may be utilised during Joins and during Sorting of results in RDBMSs. Thus the optimising compiler software is a lot more general-purpose than conventional AST compilers, which are most often limited to their respective domain.

The optimising compiler software, in some embodiments, is an AOT compiler that optimises the whole program (as opposed to JIT compilers which optimise/compile a method during program execution within the program).

Static Analysis

During static analysis of the program code, the optimising compiler software applies extended abstract interpretation to extract information about the semantics of the program (e.g.

control-flow behaviour, data-flow behaviour) and to generate and record 'paths' to significant fields and objects which can then be utilised later to quickly identify concrete values from the object graph.

The analyser creates an abstract state (which could be regarded as a form of abstract machine, ready for abstract interpretation of bytecode. Using this abstract interpretation, a classical data-flow analysis is performed on the local variables of a method, and thus the local variable types are propagated across the statements. In this way, an entity referred to herein as a "frame" (which may represent a 'before' and 'after' state) can be established for each instruction in the method body. Each such frame contains a local-variables table and an instruction parameter stack.

JVM bytecode uses a stack to pass parameters to the instruction statements. For example, to add two numbers, each number is pushed to the instruction parameter stack and an 'ADD' instruction is issued, then the addition is performed by adding the top two values in the instruction parameter stack, and the result is pushed back onto the instruction parameter stack for use by the next instruction. This is in contrast to assembler, where the instructions are defined directly with the parameters (reg/mem). This instruction parameter stack is distinct from a thread's call stack, which is represented in memory, and maintains stack allocated objects, spilled registers, call frames etc.

As an example, the abstract interpretation for the Java bytecode IADD (integer add) instruction involves the following:

creating a copy of the previous instruction's frame;

then popping the top two elements from the instruction parameter stack (which it expects to be INT types);

pushing an INT type onto the instruction parameter stack in the frame's copy;

setting the copy as the frame for this instruction;

then continuing to the next instruction.

The static analyser may initialise the initial frame with the incoming argument types and an argument path (e.g. arg-0, etc.).

The static analyser may handle the "new" operator (NEW opcode) statements specially, by recording the associated path (if present) and the type in the abstract state of the instruction.

The static analyser handles (object or static) field get and (object or static) field puts (GETFIELD, PUTFIELD, GETSTATIC and PUTSTATIC opcodes) specially in that it records a field path in the frame (i.e. the abstract state) of the instruction.

The static analyser may handle object array element loads and stores (AALOAD, AASTORE opcodes) specially, by recording an array access path in the frame of the instruction.

The static analyser may handle constant values (xCONST_x opcodes) specially, by recording the value as a path in the frame of the instruction.

The static analyser handles method calls (and method sub-calls, which may include constructor calls), e.g. the INVOKE* instructions, specially in that it records a method call path in the frame of the instruction.

The static analyser handles return (RET* optcodes) statements specially, in that it records the associated path (if present) and the type in the abstract state of the instruction.

The abstract interpretation also propagates these records across the frame (abstract state) of each instruction statement. By the means of abstract interpretation, a dependency between instructions is also established and so a (local variable) data-flow can be modelled or simulated. For example, the result of the expression "int res=a+b→var res" is dependent on STORE, which depends on IADD, and IADD is in turn dependent on load a and load b (at the bytecode level).

The term 'path' used above in relation to certain embodiments, is used herein to refer to an object constructed to comprise sufficient information to extract runtime information from the object graph (e.g. via introspection or reflection). A path comprises a list of "path elements" which are used to navigate the object graph (e.g. OGNL path) to provide fast and efficient lookup for values (e.g. field values).

Here is an example implementation of a Path class:

```
public class Path {
    ArrayList<Element> elements = new ArrayList<Path.Element>( );
    // resolves the concrete value of this path in the object graph
    public Object resolvePath( );
    static abstract class Element {
        // resolves the value of an element in the object graph
        abstract Object resolve(Object root);
    }
    // the function's incoming arguments (arg-0, arg-1, etc...)
    static class Argument extends Element {
        int argumentIndex; // → indexes into the local variable table
        // returns the argument object
        public Object resolvePath( );
    }
    // constant values
    static class ConstValue extends Element {
        java.lang.Class type;
        Object value;
        // use reflection to evaluate the constant value
        public Object resolvePath( ) { return value; }
    }
    // new operator
    static class NewObject extends Element {
        java.lang.Class type;
        // use reflection to evaluate the new operator value
        public Object resolvePath( );
    }
    // a field access
    static class FieldAccess extends Element {
        java.lang.reflect.Field targetField;
        // use reflection to lookup the field value
        public Object resolvePath( );
    }
    // object array element access
    static class ObjectArrayAccess extends Element {
        // use reflection to look up the field value
        public Object resolvePath( );
    }
    // a sub call - also maintains the paths to the sub-call's arguments
    static class MethodCall extends Element {
        java.lang.reflect.Method targetMethod;
        // use reflection to evaluate the call
        public Object resolvePath( );
    }
}
```

In some embodiments, the abstract interpretation may also capture new object array and constant assignment statements as path elements, e.g. as outlined above. However, for at least some of the RDBMS use-cases disclosed here, these path elements are sufficient, as it can be ensured that the program object graph does not change during execution.

Here is an example of what is recorded:
1: var localA=this.a→path [Argument(0), FieldAccess(a)]
2: var localB=this.a.b→path [Argument(0), FieldAccess(a), FieldAccess(b)]
3: var localB2=localA.b→path [Argument(0), FieldAccess(a), FieldAccess(b)]
4: var c=new Foo( );→path [ NewObject(Foo.class)]

It can immediately be seen that statements 2 and 3 have the same path and thus essentially look up the same value in the object graph.

After the abstract interpretation, the static analysis proceeds to scan the body of the method, and records field accesses and method (sub-)calls as higher level constructs than just using pure paths. For a field access, the type of access (read/write/static/array) is also recorded. For a method (sub-)call, the parameter paths of the sub-call (e.g. paths to the input variables/parameters of the sub-call) and also recorded as call arguments. For new objects, status is also maintained.

Thus, the optimising compiler software maintains a list of FieldAccess objects and a list of Call objects for each of the analysed method calls of the object-oriented program.

For example, it could do so using the following classes:

```
public class FieldAccess {
    Path fieldPath; // as obtained from the static analysis
    Path arrayPath; // as obtained from the static analysis
    Path indexPath; // as obtained from the static analysis
    Path valuePath; // as obtained from the static analysis
    int opcode;
    boolean isSetField( ) {
        return opcode == PUTFIELD || opcode == PUTSTATIC || opcode == AASTORE;
    }
    boolean isStatic( ) {
        return opcode == PUTSTATIC || opcode == GETSTATIC;
    }
    boolean isArray( ) {
        return opcode == AASTORE || opcode == AALOAD;
    }
}
public class CallArgs {
    Path selfPath;
    Path[ ] argPaths;
    Object[ ] args;
}
public class Call {
    List<CallArgs> arg;
}
public class NewObject {
    Path newObjectPath;
}
```

Static analysis may be performed on any or all of the static methods and/or object methods and/or constructors in the received code 101.

Optimisation—Runtime Analysis

Once the static analysis has been completed, the optimising compiler software begins the preparation for compilation. It receives the object-oriented program, comprising the root object of the object graph, and one or more interfaces (i.e. a definition restricting the properties/functions/behaviour of a class or object) for compiling.

The optimising compiler software creates a new target class that implements the requested interfaces. The interfaces effectively represent a set of root methods to trace and compile the new target class from. It should be noted that the optimising compiler software assumes that only a single thread is executing a program; this means it never expects instance field values to change, unless the (single) program thread changes these values itself.

During the runtime program analysis, the optimising compiler software starts at a root method and descends to the leaf methods (i.e. methods having no further (sub-)calls), using a depth-first approach (instead of a breath-first approach).

In order to achieve this, the optimising compiler software utilises the static analysis data generated by the analyser for a particular method, and uses the paths to look up the parameter values of a sub-call in the object-oriented program (i.e. by introspecting the object graph using the path).

For example, for each root method in the object-oriented program, the optimising compiler software may create a CallInfo object, which represents a call at a call-site. A CallInfo object may have all the concrete parameters (e.g. the arguments) of the call, as far as possibly resolvable.

The optimising compiler software may carry out the following recursive process:

1. using the "this" pointer (e.g. the arg-0 parameter), determine the concrete method being called;
2. retrieve and process the static analysis data for the current concrete method; and
3. "scan" through the current concrete method body, which involves:

3a. for each method (sub-)call in the method body, looking up and resolving the concrete call input parameters using the associated call parameter paths from the static analysis data;

3b. creating a new CallInfo object for the sub-call with the resolved concrete parameters;

3c. tracing the (sub-)call—i.e. repeating the process for the sub-call, in a recursive 'descent' process;

3d. checking the current concrete method's (object and array) field access and computing if the current call has any field writes and/or any field reads, and recording them as field access info objects (e.g. as FieldAccessInfo objects described below); and 3e. checking the current concrete method's newly created objects and computing their status by checking if the new created objects are stored in a field (object field or array field) and recording them as new object info objects (e.g. NewObjectInfo objects described below).

The optimising compiler software thus performs an iterative depth-first search through the code. By performing this runtime analysis (e.g. "tracing"), the optimising compiler software can, for instance, identify methods that need to be encouraged for de-virtualisation, and discover native calls (which cannot be executed outside the JVM), and discover recursions (which GPUs will not be able to execute), etc.

The tracing strategy is used to, effectively, determine the "transitive closure" of the concrete methods and concrete instance fields that will be relevant for (e.g. that will be utilised by) the optimised output program. The determination of "transitive closure" can be thought of as constructing a data structure that makes it possible to answer reachability questions, e.g. reachability data, as described above. Thus, the terms "transitive closure" and "reachability data" may be used interchangeably herein.

The generated CallInfo objects may be used to build a (hash-)key for caching compilations. As an example:

```
class FieldAccessInfo {
    FieldAccess access; // the path to resolve the field value
    BitSet flags; // relevant, read-only, external ...
}
class NewObjectInfo {
    NewObject newObject;
    BitSet flags; // stored into object, stored into array, external ....
}
class CallInfo {
    java.lang.reflect.Method; // the actual method
    CallArgs callArgs; // the paths to resolve the arguments
```

-continued

```
    List<FieldAccessInfo> fieldAccesses;
    List<NewObjectStatus> newObjectStatuses;
    List<CallInfo> subCalls;
    List<Path> returnPaths;
}
```

The concept of transitive closure and associated flags can be important to the optimising compiler software in order to perform certain optimisations and cross compilation. Via the transitive closure, the optimising compiler software can establish all the instance fields (and so the concrete values) in the source code object graph that will ever be used (read or written to) by the optimised program code. The transitive closure (e.g. reachability data structure) may be computed during the tracing/scanning phase of the runtime program analysis, as described above.

A simple example, in the context of RDBMSs, is now provided to help explain the relevance of transitive closure.

Assuming the following columnar table is created:

CREATE TABLE test (a bigint, b bigint, c bigint, d bigint, e bigint);

and that the program code comprises a SQL query like this:

SELECT a FROM test WHERE test.b<100;

This situation could be represented with the following classes:

```
class TableTest {
    long[ ] a, b, c, d, e;
}
class QueryFilter implements Runnable {
    TableTest test;
    List<Long> out;
    void run( ) {
        for (int i=0; i<1_000_000; i++) {
            if (test.b[i] < 100)
                out.add(test.a[i]);
        }
    }
}
```

If the table comprises 1 million rows, the memory requirements would come to roughly 8 MB per column, and for five columns the memory requirement would be 40 MB. If the table comprises 1 billion rows, the memory requirement comes to roughly 8 GB per column, therefore to initialise the full table in the memory would require 40 GB. The memory requirements for executing a program may dictate whether or not a query can be executed on a GPU.

However, the query of the program code only requires information from columns A and B. If the optimising compiler software can establish that, using the determined transitive closure, only the fields test.a and test.b are used by Query.run( ), then when compiling the target object-oriented program, initialisation of the fields c, d and e (and any other statements referencing these fields) can be omitted from the optimised program code, thus saving memory that would otherwise be needed by the GPU to execute the program.

The optimising compiler software may also track if an (instance) field value changes (i.e. is ever written to during execution of the program). If the optimising compiler software can determine that an instance-field is never modified (i.e. is immutable), during program execution, then it can inline the value of that field.

Such inlining optimisations are important for performance. For example:

z=x/2→compiler makes this to z=x>>>1; →takes 1 CPU cycle z=x/y→compiler keeps this as z=x/y; →takes about 160 CPU cycles Using the transitive closure, the bounds of which may be established via the CallInfos, if it can be determined that all the arguments and the instance fields accessed by a call and its sub-calls are immutable during the program execution, then the entire call can be evaluated directly at compile time and the return value can be inlined instead of the actual call.

The optimising compiler software may also use the transitive closure to include marks (e.g. constraints) relating to fields and/or objects and/or types that fix a status of a field and/or object and/or type. A status of a field, object or type may be, for example, "read-only", "relevant", "externally modifiable", etc. In some embodiments, a user of the optimising compiler software may be able to apply customised configuration parameters (e.g. constraint parameters) which modify the FieldAccessInfo objects to fix/constrain certain status flags, such as "relevant" or "externally modifiable" or "assume read-only" etc.

If a field/object/type is assigned to be "read-only", for example, the optimising compiler software can assume that the field/object/type does not change during execution (i.e. is immutable). Accordingly, the optimising compiler software could thus be instructed to assume that all objects of type ConstValue are read-only, or to assume that all Lists are immutable, and so on.

If a field/object/type is assigned to be "externally modifiable" it means that the optimised program needs to access the field value by reference.

If a field/object/type is assigned to be "relevant" it means that the optimising compiler software should be interested in the value of this field/object/type after program execution and implies that all the other "non-relevant" fields/objects/types comprised within the transitive closure are irrelevant and their values will never be read after execution. This enables irrelevant code to be eliminated, as will be explained later.

Loops, Etc

Before considering some of the optimisations enabled by the optimising compiler software in more detail, note that there may be cases where de-virtualisation is not possible, because the input parameter values to a (sub-)call cannot be fully established (i.e. resolved)—for example in loop statements, conditionals, etc.

If it is not possible to fully de-virtualise a program, then it will not be possible to target it outside the JVM (i.e. to cross-compile). In these cases, the optimising compiler software tries to encourage de-virtualisation by adjusting those methods as far as possible.

For example, consider the following loop:

```
void runTasks(Runnable[ ] tasks) {
    for (int i=0; i<tasks.length; i++) {
        tasks[i].run( );
    }
}
```

Equivalently, using jump (goto) statements for easier visualisation of the basic block, the loop can be expressed as:

```
void runTasks(Runnable[ ] tasks) {
    int i = 0;
    :loop__header
        if (!(i<tasks.length))
        jump loop__end;
    :loop__body
        tasks[i].run( );
    :loop__footer
        i++
        jump loop__header;
    :loop__end
}
```

The optimising compiler software can utilise static-analysis data to interrogate (introspect) the object-oriented graph and determine the concrete value of tasks. Once the value of tasks is determined then tasks.length is known, and, as i is known to be initialised with 0, and the software can perform a control flow analysis to get the basic blocks of the loop.

The optimising compiler software then creates a new basic block and templates the loop body a 'tasks.length' number of times with read references to i replaced accordingly to unroll (e.g. unwrap) the loop.

A similar approach can be taken with conditional statements. The optimising compiler software may establish the control-flow graph and thus the basic blocks of the statement, and may use the data-flow and data-dependency graphs (from the static-analysis data) to rewrite to equivalent unwrapped, and thus optimised, code.

Particular Optimisations

The optimising compiler software is enabled to apply some or all of the following optimisations: de-virtualisation, field access parameterisation, inlining, and/or irrelevant-code removal, which will now each be described in greater detail.

De-Virtualisation

Starting at a root method, the optimising compiler software 'descends' to the leaf methods (e.g. a method without any further sub-calls). Once it reaches a leaf method it first copies the method to the target class (currently being compiled) and begins to adjust it.

These adjustments may comprise:

converting the method to a static method, if required;

changing the method parameter and return types accordingly.

The optimising compiler software then goes up a call (ascends), and performs the adjustment on the calling method containing the sub-call, and changes the sub-call to the previously-coped and adjusted method. The sub-call may become an INVOKESTATIC, which in JVMs avoids the use of dynamic dispatch, thus effectively de-virtualising the sub-call.

Field Migration/Object Graph Flattening

When the optimising compiler software is adjusting a method it will migrate the fields accessed by the method to the target class.

The newly created field in the target class is declared using the concrete type of the source field's value, as opposed to the declared type of the source field.

The optimising compiler software may use the FieldAccess records in the static analysis data to do this, and change the method to use the newly created fields instead of the old ones.

This, in effect, creates a new 'pruned' object graph comprising only the relevant fields, e.g. the fields in the transitive closure.

In some case, it may be desired that certain objects/fields/types that are in the transitive closure are not migrated (i.e. copied over). In this case, these objects/fields/types can be marked or flagged in the transitive closure as being "written externally", so this field migration does not happen and instead the object containing the instance field is migrated and the instance field is accessed directly via the source object instance.

If a type is marked as "written externally" then all fields of the marked type are not copied over, and instead the containing objects are copied over (i.e. pointers) as above, and the instance fields are accessed directly via the source object instances.

Field Access Parameterisation

This transformation enables field accesses to be removed (i.e. 'hoisted out') from the method body, and instead presents the field values as function parameters of the method, thereby effectively removing field load/stores.

This, in effect, removes high level type information from the optimised methods.

All the field accesses are recorded in the static analysis data as FieldAccess objects, so the optimisation essentially involves going through them and replacing those statements with the new local variable references.

For example:

```
void test(Program this, int a) {
    return a + this.constValue;
}
becomes
void test(Program this, int a, int constValue) {
    return a + constValue;
}
```

This optimisation is particularly effective for methods comprising only field reads (e.g. load statements), but less so for methods comprising field writes (e.g. store statements). Therefore in these cases the optimising compiler software may inline those methods first. In this way, the transformation can be applied by first inlining and then parameterising the field accesses. It can easily be determined from the transitive closure if a method only comprises field reads. If it is determined that there is a call (or sub-call) within a method that writes to a field, then all the calls above this call in the tree additionally need to be inlined.

Inlining

Any of three types of inlining may be performed.

Field inlining: if it can be determined from the transitive closure that a field value is immutable (i.e. its value is constant during execution of the program), then it is safe for the optimising compiler software to inline the field value Call inlining: when a call (and its sub-calls) only reads fields, and the parameters of the call are immutable, then the optimising compiler software can evaluate the call and inline the result Method inlining: a call may be replaced with the body of the called method

New Operator Elimination

If the status of a newly created object is determined to not escape, meaning it is created and destroyed within the program code without the object ever escaping the transitive closure, then the new operator can be eliminated by replacing it with a field access to a newly generated field in the new class. That new field is initialised with a new object instance of the relevant type.

```
class Task {
    Foo getFoo(int a) {
        Foo foo = new Foo( );
        foo.a = a;
        return foo;
    }
}
```

Supposing that foo (=new Foo( )) is never stored in an array of object field, then it is safe to eliminate the new operation with a field access as shown below.

```
class OptimisedTask {
    Foo foo = new Foo( );
    Foo getFoo(int a) {
        Foo foo = this.foo;
        foo.a = a;
        return foo;
    }
}
```

Irrelevant-Code Removal

Irrelevant-code removal works in a similar manner to the known optimisation of dead code removal, but instead of only removing dead local variables and their related statements, the optimising compiler software can also remove live (and dead) fields depending on the status of the fields in the transitive closure.

For example, consider the code, before optimisation:

```
class TimingTaskWrapper {
    long startTime;
    long endTime;
    long resultCode;
    Task actualTask;
    public void run( ) {
        Logger.log("starting task");
        startTime = System.currentTimeMillis( );
        resultCode = actualTask.doSomething( );
        endTime = System.currentTimeMillis( );
        Logger.log("finished task");
    }
}
```

Supposing the optimising compiler software flags (i.e. marks) the field resultCode as relevant, then the optimising compiler software can determine, via the run method's static-analysis data, the set of all the incoming statements utilising the resultCode field. Every statement that is not determined as being in the "relevant" set is thus "irrelevant" for the optimised program code and can be removed.

Thus, after optimisation the code becomes simply:

```
class TimingTaskWrapper {
    long resultCode;
    Task actualTask;
```

-continued

```
public void run( ) {
    resultCode = actualTask.doSomething( );
    }
}
```

Elimination of Autoboxing

Autoboxing refers to the automatic conversion, by a compiler, between primitive types (e.g. "int") and their corresponding object wrapper classes (e.g. "Integer") when compiling code.

To support more effective optimisation, some embodiments of the optimising compiler eliminate autoboxing by instead inserting explicit type conversion instructions into the optimised program code, by peephole optimization, before compilation.

Compilation

The optimising compiler software may check via the tracing (hash-)key if an optimised program has already been compiled, and if not, it compiles the code by applying all or some of the above optimisations, and generates the root method stubs (e.g. the interface methods) on the newly created target class.

The root method stubs may be generated in such a fashion that they load the field values and issue a call to the respective static root method by passing the values as parameters.

Then the optimising compiler software creates a new instance of the target class and copies over the field values from the source program and returns the new instance.

The optimising compiler software may, in some embodiments, comprise a back-end compiler in order to compile the optimised program code for a particular target platform. Alternatively, the optimising compiler software may be configured to pass the optimised program code to an external back-end compiler. Examples of possible target platforms and/or back-end compilations are provided below:

Cross Compilation Via LLVM™

It may be advantageous to be able to cross compile the source program code, i.e. to generate executable code for a platform other than the one on which the optimising compiler software is running.

Once the source program code has been (fully or partially) optimised the optimised program code may only contain fields of primitive and (intrinsically) known types by a LLVM™ backend. The LLVM™ cross compiler infrastructure has currently been restricted to only accept Runnable objects and, thus, is able to only compile and execute whole tasks. However the LLVM™ backend (of the optimising compiler software) can translate the method(s) of the optimised program into LLVM™ IR (Intermediate Representation). It can perform Java type to LLVM™ type mapping (of primitives and known types). It can translate the variables usage correctly into LLVM™ Static Single Assignment (SSA) form. It can map the fields of the flat/fat program object to a memory buffer. It can also apply LLVM™ optimisation passes.

CPU Target

The backend may create an entry LLVM™ IR method to be invoked via Java™ Native Interface (JNI) and then may utilise a LLVM™ JIT to translate the LLVM™ IR to machine code and link the assembly into the current process. It may create a custom implementation of Runnable holding a reference to the original program. In the method to be run, the LLVM™ backend may create a memory buffer, copy the relevant fields into the buffer and then use JNI to pass control to the entry method. Once control returns to the LLVM™ backend, it copies the relevant fields back into the source object graph's fields, so that the optimising compiler software may inspect the results.

CUDA Target

The backend may create a CUDA conform entry method in LLVM™ IR, and may utilise the LLVM™ Parallel Thread Execution (PTX) backend to generate PTX code from LLVM™ IR code, then may pass that to CUDA to generate GPU machine code. Next it may create a custom implementation of Runnable holding a reference to the original program code. In the method to be run, the backend may create a memory buffer, copy the relevant fields into the buffer and then use CUDA to copy over the buffer(s) and execute the CUDA code. Once the CUDA code has been executed, the backend copies the relevant fields back into the source object's (graphs) fields, so that the optimising compiler software may inspect the results.

SPRIV Target

The backend may create an OpenCL/Vulcan conform entry method in LLVM™ IR, may utilise the Khronos LLVM™ to pass to a Standard Portable Intermediate Representation (SPIR-V) converter, then may pass that to OpenCL/Vulcan to generate GPU machine code. Then it may create a custom implementation of Runnable holding a reference to the original program code. In the method to be run, the backend may create a memory buffer, copy the relevant fields into the buffer and then use OpenCL/Vulcan to copy over the buffer(s) and execute the OpenCL/Vulcan code. Once the OpenCL/Vulcan code has been executed, the backend copies the relevant fields back into the source object's (graphs) fields, so that the optimising compiler software may inspect the results.

OpenCL C Backend

The backend may convert optimised program methods (in bytecode) to OpenCL C (provided there are only primitives and known types in the IR), then may introduce an OpenCL kernel entry method to read the fields from buffers and may pass the C code down to OpenCL to generate GPU machine code. Then it may create a custom implementation of Runnable holding a reference to the original program code. In the method to be run, the backend may create a memory buffer, copy the relevant fields into the buffer and then use OpenCL to copy over the buffer(s) and execute the OpenCL C code. Once the OpenCL C code has been executed, the backend copies the relevant fields back into the source object's (graphs) fields, so that the optimising compiler software may inspect the results.

Experimental Validation

A prototype RDBMS optimising compiler, referred to as "EE", was implemented, according to principles disclosed herein. Benchmarking was carried out on an AMD™

FX-8350 processor. The benchmarking was applied to the SQL level by trying to execute as many SQL statements as possible within one minute.

A summary of benchmarking results is presented below, comparing SQL query performance between three versions of the code:

i) unoptimised Java bytecode (labelled "none"), ii) Java bytecode generated by the optimising compiler (labelled "jvm"), and iii) native code generated by the optimising compiler and LLVM™ compiler (labelled "cpu").

As can be seen from the query times, both optimised versions performed significantly faster than the original unoptimised code, with the optimised native code further outperforming the optimised Java code.

SQL: USE EE JVM;

SQL: SELECT id, val from test WHERE id<100;

Benchmark 1

DDL: CREATE TABLE test (id INT, val INT);

ROWS: 16777216

SQL: SELECT id, val from test WHERE id<100;

Benchmark 1 Results

EE none, queries in 63714 ms: 13, avg ms per query: 4901.076923076923

EE jvm, queries in 60041 ms: 269, avg ms per query: 223.2007434944238

EE cpu, queries in 60044 ms: 855, avg ms per query: 70.22690058479532

Benchmark 2

DDL: CREATE TABLE test (id INT, val INT);

ROWS: 16777216

SQL: SELECT id, val from test WHERE id<100 AND val=4;

Benchmark 2 Results

EE none, queries in 67412 ms: 4, avg ms per query: 16853.0

EE jvm, queries in 60353 ms: 66, avg ms per query: 914.439393939394

EE cpu, queries in 60006 ms: 790, avg ms per query: 75.95696202531646

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A computer-implemented method for optimising object-oriented program code, the method comprising:

receiving object-oriented program code;

performing a static analysis on a call of the object-oriented program code to simulate an effect of the call on an abstract state, and generating static-analysis data representative of the effect of the call on the abstract state;

introspectively accessing an object graph, generated from the program code, to determine a property of the call; and generating optimised program code from the received object-oriented program code, wherein generating the optimised program code comprises using the static-analysis data and the determined property to optimise the call in the optimised program code.

2. The method of claim 1, wherein the abstract state comprises a simulated local memory, and wherein simulating the effect of the call on the abstract state comprises initialising the simulated local memory of the abstract state with a parameter of the call.

3. The method of claim 2, wherein simulating the effect of the call on the abstract state comprises determining a cumulative effect of one or more statements in a body of the call, on the simulated local memory; and wherein generating the static-analysis data comprises storing, in the static-analysis data, data representative of the simulated local memory after the cumulative effect of said one or more statements.

4. The method of claim 1, wherein simulating the effect of the call on the abstract state comprises identifying that a statement in a body of the call comprises a field access; and wherein generating the static-analysis data comprises storing, in the static-analysis data, a path to the field in the object graph and/or a type of the field access.

5. The method of claim 4, wherein the field is an element of an array.

6. The method of claim 1, wherein simulating the effect of the call on the abstract state comprises identifying that a statement in a body of the call comprises a sub-call; and wherein generating the static-analysis data comprises:

determining an input parameter of the sub-call from the simulated local memory of the abstract state; and storing, in the static-analysis data, a path to a method or function called by the sub-call and/or a path to the input parameter of the sub-call.

7. The method of claim 1, wherein simulating the effect of the call on the abstract state comprises identifying that a statement is a return statement; and wherein generating the static-analysis data comprises storing, in the static-analysis data, a path for a return variable of the return statement in the object graph and/or a type for the return variable.

8. The method of claim 1, wherein simulating the effect of the call on the abstract state comprises identifying that a statement in a body of the call comprises a constant value; and wherein generating the static-analysis data comprises storing, in the static-analysis data, a path to the constant value.

9. The method of claim 1, wherein simulating the effect of the call on the abstract state comprises identifying that a statement comprises an operator for creating a new object of a predetermined type; and wherein generating the static-analysis data comprises storing, in the static-analysis data, the type of the object to be created.

10. The method of claim 1, comprising performing the static analysis on some or all static methods and object methods of the received object-oriented program code, including some or all constructors of the program code.

11. The method of claim 1, wherein the property determined by introspectively accessing the object graph is a type or a value or a class of: an input parameter of the call, or a field or variable within the call, or a return of the call.

12. The method of claim 1, comprising processing the static-analysis data and the determined property to generate reachability data for the received object-oriented program code using a recursive process that analyses some or all calls of the received object-oriented program code.

13. The method of claim 1, wherein generating the optimised program code comprises:

processing the static-analysis data and the determined property to determine reachability data for the call; and analysing the reachability data for the call to determine where to optimise the received program code.

14. The method of claim 13, wherein determining the reachability data for the call comprises:

identifying a field access in a body of the call;

processing the static-analysis data to determine a path to the field in the object graph; and storing data representative of the path to the field in a reachability data structure.

15. The method of claim 14, wherein determining the reachability data for the call further comprises:

processing the static-analysis data to determine a type of the field access; and storing data representative of the type of the field access in a reachability data structure.

16. The method of claim 14, wherein generating the optimised program code comprises:

determining a value of the field by introspectively accessing the object graph using the field path; and replacing the field access with the determined value in the optimised program code.

17. The method of claim 13, wherein determining the reachability data for the call comprises:

identifying an input parameter of the call;

processing the static-analysis data to determine a path to a body of the call, and to determine a path to the input parameter, in the object graph; and storing data representative of the path to the body of the call, and of the path to the input parameter, in a reachability data structure.

18. The method of claim 1, wherein the received object-oriented program code comprises or implements a Structured Query Language (SQL) statement for querying a relational database.

19. A computer processing system for optimising object-oriented program code, the computer processing system comprising a processor and a memory storing computer software comprising instructions which, when executed on the processor, cause the processor to implement a method comprising:

receiving object-oriented program code;

performing a static analysis on a call of the object-oriented program code to simulate an effect of the call on an abstract state, and generating static-analysis data representative of the effect of the call on the abstract state;

introspectively accessing an object graph, generated from the program code, to determine a property of the call; and generating optimised program code from the received object-oriented program code, wherein generating the optimised program code comprises using the static-analysis data and the determined property to optimize the call in the optimised program code.

20. A non-transitory computer-readable medium storing computer software for optimising object-oriented program code, the computer software comprising instructions which, when executed by a processor, cause the processor to implement a method comprising:

receiving object-oriented program code;

performing a static analysis on a call of the object-oriented program code to simulate an effect of the call on an abstract state, and generating static-analysis data representative of the effect of the call on the abstract state;

introspectively accessing an object graph, generated from the program code, to determine a property of the call; and generating optimised program code from the received object-oriented program code, wherein generating the optimised program code comprises using the static-analysis data and the determined property to optimize the call in the optimised program code.

* * * * *